United States Patent [19]
Soirinsuo et al.

[11] Patent Number: 6,032,272
[45] Date of Patent: Feb. 29, 2000

[54] METHOD AND APPARATUS FOR PERFORMING PACKET BASED POLICING

[75] Inventors: Timo Soirinsuo; Pasi Vaananen, both of Cambridge, Mass.

[73] Assignee: Nokia Telecommunications, Oy, Espoo, Finland

[21] Appl. No.: 08/924,590

[22] Filed: Sep. 5, 1997

[51] Int. Cl.$^7$ .................................................. G06F 11/00
[52] U.S. Cl. .......................................... 714/706; 370/236
[58] Field of Search .................................. 714/706, 812; 370/412, 79, 400; 395/200

[56] References Cited

U.S. PATENT DOCUMENTS

| | | | |
|---|---|---|---|
| 5,515,373 | 5/1996 | Lynch et al. | 370/79 |
| 5,649,108 | 7/1997 | Spiegel et al. | 395/200.12 |
| 5,764,641 | 6/1999 | Lin | 370/412 |

*Primary Examiner*—Emmanuel L. Moise
*Assistant Examiner*—Esaw Abraham
*Attorney, Agent, or Firm*—Altera Law Group, LLC

[57] ABSTRACT

A packet based policing method and apparatus is disclosed which increases the throughput of a network by avoiding the waste of resources. The invention receives cells for a first packet at a node in a network, determines whether a non-conforming cell may be passed according to a running credit value, identifies whether a cell is conforming or non-conforming, passes the cell if the running credit value indicates that a non-conforming cell may be passed or if the cell is a conforming cell, borrows a cell credit if the credit value indicates that a non-conforming cell cannot be passed, wherein the borrowing of the cell credit allows the running credit value to be decremented until reaching a predetermined negative number and decrements the running credit value. All cells in the next packet are discarded and the credit value is incremented for each conforming cell in the next packet, which results in the credit value having a bonus credit value added thereon if the number of conforming cells discarded in the next packet exceeds the number of borrowed cells required to pass the first packet. All cells of all subsequent packets are discarded until the borrowed cell credits have been accounted for. Whether the cell is the last cell of the first frame is ascertained and the last cell is processes so that cells of the first packet are not merged with cells passed next.

45 Claims, 10 Drawing Sheets

| Layer Name | | Functions Performed |
|---|---|---|
| Higher Layers | | Higher Layer Functions |
| A A L | Convergence Sublayers (CS) | Common Part (CP) |
| | | Service Specific (SS) |
| | SAR Sublayer | Segmentation And Reassembly |
| ATM | | Generic Flow Control<br>Call Header Generation/Extraction<br>Cell VCI/VPI Translation<br>Cell Multiplexing/Demultiplexing |
| P h y s i c a l | Transmission Convergence (TC) Sublayer | Cell Rate Decoupling<br>Cell Delineation<br>Transmission Frame Adaption<br>Transmission Frame Generation/Recovery |
| | Physical Medium (PM) | Bit Timing<br>Physical Medium |

Layer Management

Fig. 2

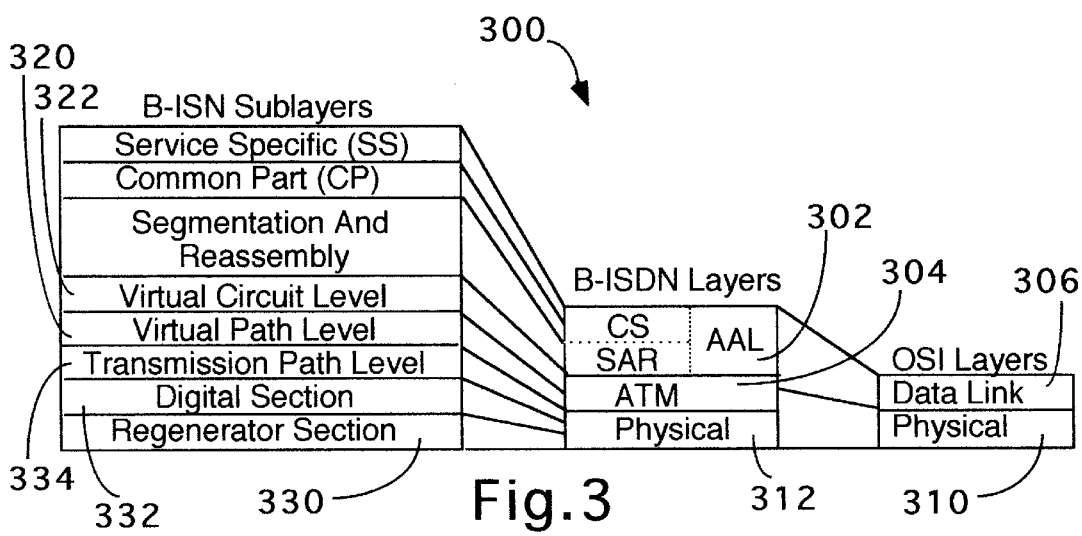

Fig. 3

| Credit\State | Reserve | Normal | Bonus |
|---|---|---|---|
| Credit | Negative value up to MRC | Credit = Normal Cell based policing | Bonus Credit = Normal Cell based policing + extra credit |
| Action | Keep forwarding only until the end of the packet that causes entering reserve state, then discard until predefined credit value is achieved. | Act as normal cell based policing | Act as normal cell based Policing, but temporarily with bigger credit |

Credit Values

Fig.7

| Old State | New State |
|---|---|
| Reserve | Normal |
| Reserve | Bonus |
| Normal | Reserve |
| Bonus | Normal |

Allowed State Transitions

Fig.8

METHOD AND APPARATUS FOR PERFORMING PACKET BASED POLICING

BACKGROUND OF THE INVENTION

1. Field of the Invention

This invention relates in general to a packet based policing method and apparatus, and more particularly to a policing method and apparatus that increases the throughput of a network by avoiding the waste of resources.

2. Description of Related Art

Cell relay refers to any data communications technology that is based on transmission of small, fixed-length data units called cells. Cells are made up of a header field, containing address information, and an information field, carrying user data. With cell relay, a cell converter takes the constant-bit-rate streams of voice and video devices and the variable-bit-rate streams of data devices and converts them into cells. These cells are then routed across a cell relay network to multiple destinations, based on the address information in the headers. At each destination, other cell converters recreate the bit streams and deliver them to the user devices. With cell relay, separate applications can be consolidated onto a single, higher speed network, thereby improving overall price/performance. Furthermore, because a cell relay network is based on switching fixed-length data units, it is possible to build high performance switching fabrics supporting burst rates of hundreds of megabits per second.

Asynchronous Transfer Mode (ATM) is just one example of a cell-based switching and multiplexing technology. ATM is designed to be a general-purpose, connection-oriented transfer mode for a wide range of services. Today, ATM is being used on local area networks (LANs), metropolitan area networks (MANs) and wide area networks (WANs). As a result, ATM is rapidly becoming the premier protocol for many communication and networking applications. With ATM installed on LANs, MANs and WANs, all types of voice, data and video traffic can operate together seamlessly. No other protocol offers this seamless integration of information, making ATM a catalyst for technological advances in telecommunications, multimedia and other markets.

ATM handles both connection-oriented traffic and connectionless traffic through the use of adaptation layers. Typically, ATM virtual connections operate at either a Constant Bit Rate (CBR) or a Variable Bit Rate (VBR). Each ATM cell sent into the network contains addressing information that establishes a virtual connection from origination to destination. All cells are then transferred, in sequence, over this virtual connection. ATM provides either Permanent or Switched Virtual Circuits (PVCs or SVCs). ATM is asynchronous because the transmitted cells need not be periodic as time slots of data as in Synchronous Transfer Mode (STM).

ATM offers the potential to standardize on one network architecture, which defines the multiplexing and switching method. ATM also supports multiple Quality of Service (QoS) classes for differing application requirements on delay and loss performance. Thus, the vision of ATM is that an entire network can be constructed using ATM and ATM Application Layer (AAL) switching and multiplexing principles to support a wide range of all services, such as:

Voice

Packet data (Switched MultiMegabit Data Service (SMDS), Internet Protocol (IP), Frame Relay (FR)

Video

Imaging

Circuit emulation

ATM also provides bandwidth-on-demand through the use of SVCs, and also supports LAN-like access to available bandwidth.

ATM standards define a fixed-size cell with a length of 53 octets (or bytes) comprised of a 5-octet header and a 48-octet payload. With a relatively small cell size, ATM is a compromise between the long frames generated in data communications and the short, repetitive transmissions required for voice communications, video transmission and other isochronous data transmission.

The bits in the cells are transmitted over the transmission path in a continuous stream. Cells are mapped into a physical transmission path, such as the North American Digital Signal Level 1 (DS1), DS3, or SONET; International Telecommunications Union—Telecommunications standardization sector (ITU-T) SDH standards; and various other local fiber and electrical transmission payloads.

All information is switched and multiplexed in an ATM network using these fixed-length cells. The cell header identifies the destination, cell type, and priority. The fixed cell size simplifies the implementation of ATM switches and multiplexers while providing very high speeds.

When using ATM, longer packets cannot delay shorter packets as in other switched implementations because long packets are chopped up into many cells. This enables ATM to carry Constant Bit Rate (CBR) traffic such as voice and video in conjunction with Variable Bit-Rate (VBR) data traffic, potentially having very long packets within the same network.

Three major concepts in ATM are: the transmission path, the Virtual Path (VP), and, optionally, the Virtual Channel (VC). These form the basic building blocks of ATM. A physical transmission path contains one or more virtual paths (VPs), while each virtual path contains one or more Virtual Channels (VCs). Thus, multiple virtual channels can be trunked on a single virtual path. Switching can be performed on either a transmission path, virtual path, or virtual circuit (i.e., channel) level.

This capability to switch down to a virtual channel level is similar to the operation of a Private or Public Branch Exchange (PBX) or telephone switch in the telephone world. In the PBX/switch, each channel within a trunk group (path) can be switched. Devices which perform VC connections are commonly called VC switches because of this analogy with telephone switches. Transmission networks use a cross-connect, which is basically a space division switch, or effectively an electronic patch panel. ATM devices which connect VPs are commonly called VP cross-connects by analogy with the transmission network.

At the ATM layer, users are provided a choice of either a Virtual Path Connection (VPC) or a Virtual Channel Connection (VCC). VPCs are switched based upon the Virtual Path Identifier (VPI) value only. The users of the VPC may assign the VCCs within that VPI transparently since they follow the same route. VCCs are switched upon the combined VPI and Virtual Channel Identifier (VCI) value.

Both VPIs and VCIs are used to route cells through the network. It should be noted that VPI and VCI values must be unique on a specific transmission path (TP). Thus, each transmission path between two network devices (such as ATM switches) uses VPIs and VCIs independently.

ATM is a scaleable standard that does not specify requirements for transmission rates, framing and physical layers. Rather, ATM switching and ATM networks refer only to the handling of cells. ATM does not dictate the content of information carried in cells. Accordingly, broadband networks must develop guarantees on bandwidth, delay and jitter to support a wide variety of ATM applications.

As mentioned earlier, the ATM Adaptation Layer (AAL) is used to assemble and reassemble packets into/from cells. For this purpose, four standards, AAL-1 through AAL-4, were initially defined to directly map to AAL service classes A through D. Class A is designated for constant bit-rate (CBR) service. Class B is for variable bit-rate (VBR) service with end-to-end timing, and is connection-oriented. Class C is for variable bit-rate (VBR) service with no timing required, and is connection-oriented. Finally, Class D is for variable bit-rate (VBR) service with no timing required, and supports connectionless topologies.

ALL-5 was conceived by the computer industry in response to perceived complexity and implementation difficulties in the AAL-3/4. While the AAL-3/4 provides a rich set of services, it does so at the expense of additional protocol overhead and processing. However, AAL-3/4 supports the multiplexing of the traffic originating from the multiple sessions or connections onto the same ATM virtual channel connection. Multiplexing capability requires the use of four bytes of each ATM cell for supporting the overhead information required for data encapsulation. Accordingly, AAL-3/4 is not widely used because of this extra overhead.

Based on ATM Forum standards, traffic policing is used by network operators to ensure that customer ATM cell-traffic levels do not exceed the bandwidth agreed on in Quality of Service (QoS) contracts. As ATM traffic continues to grow, traffic policing becomes increasingly important. Given that a switch at the edge of the network has accepted a virtual circuit request, a switch must ensure that the customer equipment keeps its promises. The policing function in some way estimates the parameters of the incoming traffic and takes some action if they measure traffic exceeding agreed parameters. This action could be to drop the cells, mark them as being low cell-loss priority, etc.

In the current ATM standards, the policing function has been defined to protect the network from the sources which do not conform to the behavior of their respective traffic contract established using some signaling method. Currently defined traffic policing mechanisms work by discarding individual ATM cells from the incoming ATM virtual channel connections. However, the problem with the current method is that in case of the traffic being data traffic, the discarding of even a single cell belonging to an AAL-5 packet effectively makes the rest of the packet unusable, and will cause packet discard on the receiving ATM connection endpoint. The cells, which are left for transmission are thus unnecessarily carried through the network wasting network resources.

It can be seen that there is a need for a packet policing method that avoids the waste of resources as a result of traffic having non-conforming behavior characteristics.

It can also be seen that there is a need for a policing method that increases the throughput of a network.

SUMMARY OF THE INVENTION

To overcome the limitations in the prior art described above, and to overcome other limitations that will become apparent upon reading and understanding the present specification, the present invention discloses a packet based policing method.

The present invention solves the above-described problems by policing cell traffic in a manner which increases the throughput of a network by avoiding the waste of resources.

A system in accordance with the principles of the present invention receives cells for a first packet at a node in a network, determines whether a non-conforming cell may be passed according to a running credit value, identifies whether a cell is conforming or non-conforming, passes the cell if the running credit value indicates that a non-conforming cell may be passed or if the cell is a conforming cell, borrows a cell credit if the credit value indicates that a non-conforming cell cannot be passed, wherein the borrowing of the cell credit allows the running credit value to be decremented until reaching a predetermined negative number and decrements the running credit value.

Other embodiments of a system in accordance with the principles of the invention may include alternative or optional additional aspects. One such aspect of the present invention is that all cells of the packet immediately subsequent to the first packet are discarded and the credit value is incremented for each conforming cell of the subsequent packet that was discarded.

Another aspect of the present invention is that incrementing the credit value for each conforming cell of the subsequent packet that was discarded results in the credit value having a bonus credit value added thereon if the number of conforming cells discarded in the subsequent packet exceeds the number of cells borrowed to pass the first packet.

Another aspect of the present invention is that all cells of all subsequent packets are discarded until the number of discarded conforming cells for all subsequent packets is not less than the number of borrowed cell credits used in passing cells of the first packet.

Another aspect of the present invention is that the predetermined negative number represents a Maximum Reserve Credit (MRC).

Yet another aspect of the present invention is that whether the cell is the last cell of the first frame is ascertained and the last cell is processed so that cells of the first packet are not merged with cells passed next.

Another aspect of the present invention is that an abort cell is sent in place of the last cell to cause the other cells in the first packet to be discarded.

Still another aspect of the present invention is that the last cell and all subsequent cells are discarded until another last cell is received, the last cell being passed and merged with the other passed cells of the first packet.

Another aspect of the present invention is that the last cell is passed and all non-conforming cells passed before the last cell are deleted.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2 illustrates four Broadband-Integrated Services Digital Network/Asynchronous Transfer Mode (B-ISDN/ATM) layers along with the sublayer structure of the ATM Adaptation Layer (AAL) and Physical (PHY) layer;

FIG. 3 illustrates the mapping of the B-ISDN layers to the OSI layers and the sublayers of the PHY, ATM, and ATM Adaptation layers;

FIG. 7 illustrates a chart of the credit values and actions for a packet based policing method according to the present invention;

FIG. 8 illustrates the allowed state transitions between the three credit states discussed with reference to FIG. 7;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a packet based policing method and apparatus is disclosed which increases the throughput of a network by avoiding the waste of resources. The invention receives cells for a first packet at a node in a network, determines whether a non-conforming cell may be passed according to a running credit value, identifies whether a cell is conforming or non-conforming, passes the cell if the running credit value indicates that a non-conforming cell may be passed or if the cell is a conforming cell, borrows a cell credit if the credit value indicates that a non-conforming cell cannot be passed, wherein the borrowing of the cell credit allows the running credit value to be decremented until reaching a predetermined negative number and decrements the running credit value.

All cells in the next packet are discarded and the credit value is incremented for each conforming cell in the next packet, which results in the credit value having a bonus credit value added thereon if the number of conforming cells discarded in the next packet exceeds the number of borrowed cells required to pass the first packet. All cells of all subsequent packets are discarded until the borrowed cell credits have been accounted for. Whether the cell is the last cell of the first frame is ascertained and the last cell is processed so that cells of the first packet are not merged with cells passed next.

Figure 1:
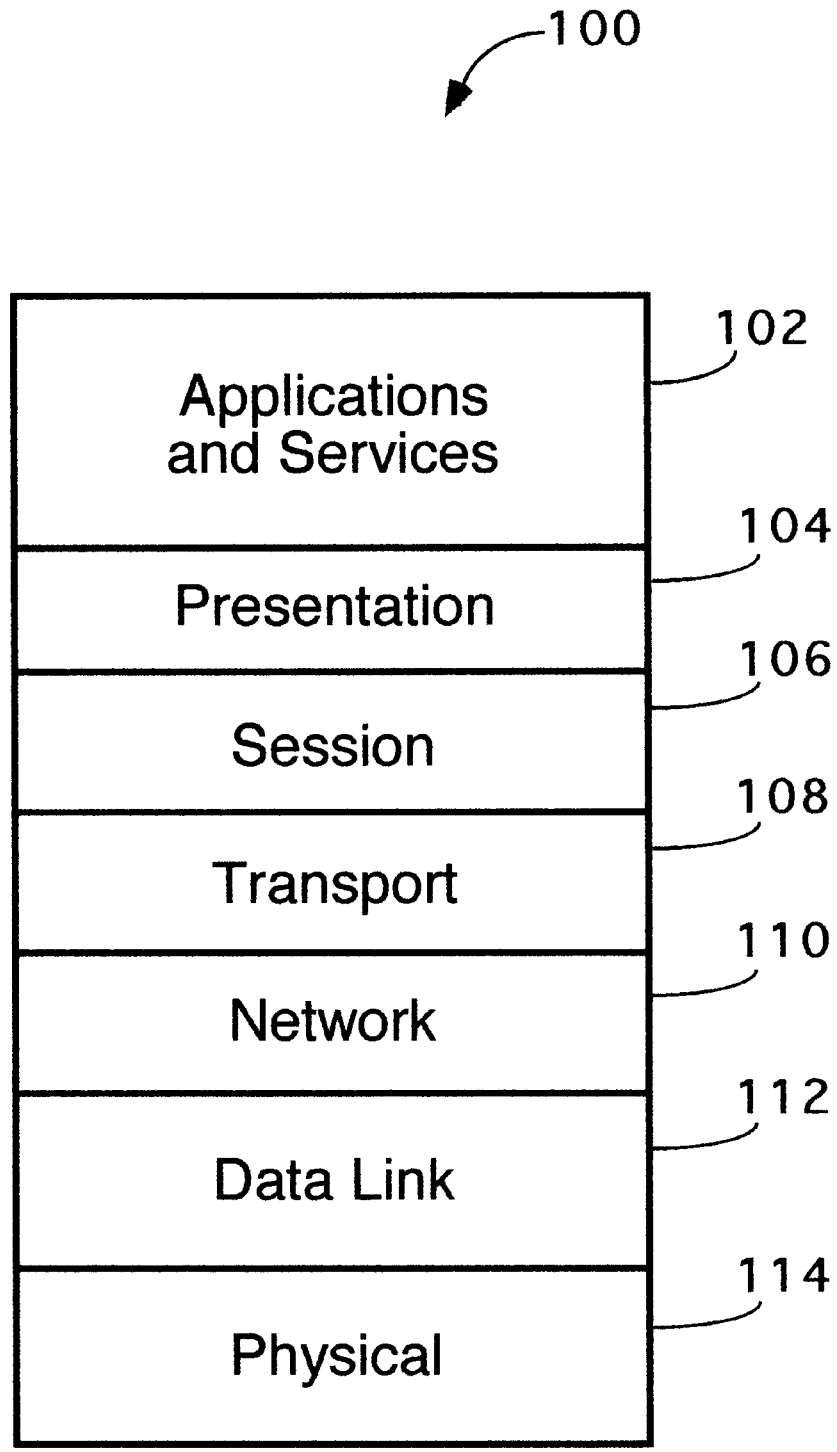
FIG. 1 illustrates the seven layer Open Systems Interconnection (OSI) model.

As will be appreciated by those skilled in the art, communication networks (e.g., ATM) and their operations can be described according to the Open Systems Interconnection (OSI) model 100 which includes seven layers including an application 102, presentation 104, session 106, transport 108, network 110, link 112, and physical 114 layer as illustrated in FIG. 1. The OSI model 100 was developed by the International Organization for Standardization (ISO) and is described in "The Basics Book of OSI and Network Management" by Motorola Codex from Addison-Wesley Publishing Company, Inc., 1993 (First Printing September 1992).

Each layer of the OSI model 100 performs a specific data communications task, a service to and for the layer that precedes it (e.g., the network layer provides a service for the transport layer). The process can be likened to placing a letter in a series of envelopes before it's sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. Each time that user application data passes downward from one layer to the next layer in the same system, more processing information is added. When that information is removed and processed by the peer layer in the other system, it causes various tasks (error correction, flow control, etc.) to be performed.

The ISO has specifically defined all seven layers, which are summarized below in the order in which the data actually flow as they leave the source:

Layer 7, the application layer 102, provides for a user application (such as getting money from an automatic bank teller machine) to interface with the OSI application layer 102. That OSI application layer 102 has a corresponding peer layer in the other open system, the bank's host computer.

Layer 6, the presentation layer 104, makes sure the user information (a request for $50 in cash to be debited from your checking account) is in a format (i.e., syntax or sequence of ones and zeros) the destination open system can understand.

Layer 5, the session layer 106, provides synchronization control of data between the open systems (i.e., makes sure the bit configurations that pass through layer 5 106 at the source are the same as those that pass through layer 5 106 at the destination).

Layer 4, the transport layer 108, ensures that an end-to-end connection has been established between the two open systems and is reliable (i.e., layer 4 108 at the destination confirms the request for a connection, so to speak, that it has received from layer 4 108 at the source).

Layer 3, the network layer 110, provides routing and relaying of data through the network (among other things, at layer 3 110 on the outbound side an address gets slapped on the envelope which is then read by layer 3 110 at the destination).

Layer 2, the data link layer 112, includes flow control of data as messages pass down through this layer in one open system and up through the peer layer in the other open system.

Layer 1, the physical interface layer 114, includes the ways in which data communications equipment is connected mechanically and electrically, and the means by which the data move across those physical connections from layer 1 114 at the source to layer 1 114 at the destination.

This same layering principals have been applied to ATM communication networks. FIG. 2 shows four BroadbandIntegrated Services Digital Network/Asynchronous Transfer Mode (B-ISDN/ATM)layers 210 along with the sublayer structure of the ATM Adaptation Layer (AAL) 240 and Physical (PHY) layer 260. Starting from the bottom, the Physical layer 260 has two sublayers: Transmission Convergence (TC) 262 and Physical Medium (PM) 264. The PM sublayer 264 interfaces with the actual physical medium and passes the recovered bit stream to the TC sublayer. The TC sublayer 262 extracts and inserts ATM cells within the Plesiochronous or Synchronous (PDH or SDH) Time Division Multiplexed (TDM) frame and passes these to and from the ATM layer, respectively.

The ATM layer 210 performs multiplexing, switching, and control actions based upon information in the ATM cell header and passes cells to, and accepts cells from, the ATM Adaptation Layer (AAL) 240. The AAL 240 has two sublayers: the Segmentation And Reassembly (SAR) sublayer 242 and the Convergence Sublayer (CS) 250. The CS 250 is further broken down into Common Part (CP) 252 and Service-Specific (SS) 254 components. The AAL 240 passes Protocol Data Units (PDUs) to and accepts PDUs from higher layers 270. PDUs may be of variable length, or may be of fixed length different from the ATM cells length.

The Physical layer 260 corresponds to layer 1 114 in the OSI model illustrated in FIG. 1. The ATM layer 210 and AAL 240 correspond to parts of OSI layer 2 112, but the address field of the ATM cell header has a network-wide connotation that is like OSI layer 3 110. The B-ISDN and ATM protocols and interfaces make extensive use of the OSI concepts of layering and sublayer.

FIG. 3 illustrates the mapping 300 of the B-ISDN layers to the OSI layers and the sublayers of the PHY, ATM, and ATM Adaptation layers. FIG. 3 illustrates that the AAL layer 302 and ATM layer 304 do not match exactly with the data link layer 306 of the OSI model. Furthermore, FIG. 3 illustrates that the functions of the physical layer 310 of the OSI model do not map precisely to the physical layer 312 of the B-ISDN model.

The following describes the Asynchronous Transfer Mode (ATM) layer 304. To construct and interpret ATM Virtual Paths (VPs) and Virtual Channels (VCs), the ATM layer includes a virtual path sublayer 320 and Virtual Channel layer 322. The physical layer 312 is composed of three levels: regenerator section 330, digital section 332, and transmission path 334. At the ATM layer 304, the transmission path is the main area of focus because this is essentially the TDM payload that connects ATM devices. Generically, an ATM device may be either an endpoint or a connecting point for a VP or VC. A Virtual Path Connection (VPC) or a Virtual Channel Connection (VCC) exists only between endpoints. A VP link or a VC link can exist between an endpoint and a connecting point or between connecting points. A VPC or VCC is an ordered list of VP or VC links, respectively, that define a unidirectional flow of ATM cells from one user to one or more other users.

Several key functions are performed by each sublayer of the ATM layer 304. The ATM layer 304 provides many functions, including:

Cell Construction

Cell Reception and Header Validation

Cell Relaying, Forwarding, and Copying Using the VPI/VCI

Cell Multiplexing and Demultiplexing Using the VPI/VCI

Cell Payload Type Discrimination

Interpretation of pre-defined Reserved Header Values

Cell Loss Priority Processing

Support for Multiple QoS Classes

Usage Parameter Control (UPC)

Explicit Forward Congestion Indication (EFCI)

Generic Flow Control

Connection Assignment and Removal

The attributes of the service class for AAL 302 are the timing relationships required between the source and destination, whether the bit rate is constant or variable, and whether the connection mode is connection-oriented or connectionless. The four AAL service classes are as follows:

Class A—constant bit-rate (CBR) service with end-to-end timing, connection-oriented Class B—variable bit-rate (VBR) service with end-to-end timing, connection-oriented Class C—variable bit-rate (VBR) service with no timing required, connection-oriented Class D—variable bit-rate (VBR) service with no timing required, connectionless As mentioned earlier, AAL-1 through AAL-4 were initially defined to directly map to the AAL service classes A through D. AAL-5 was conceived by the computer industry in response to perceived complexity and implementation difficulties in the AAL-3/4. While the AAL-3/4 provides a rich set of services, it does so at the expense of additional protocol overhead and processing. AAL-5, originally coined the Simple and Efficient Adaptation Layer (SEAL), was designed to provide similar services at lower overhead. AAL-5 takes advantage of the ATM End of Message (EOM) flag to signal the end of a single message. Significant overhead is eliminated by removing the SAR header and trailer.

Figure 4:
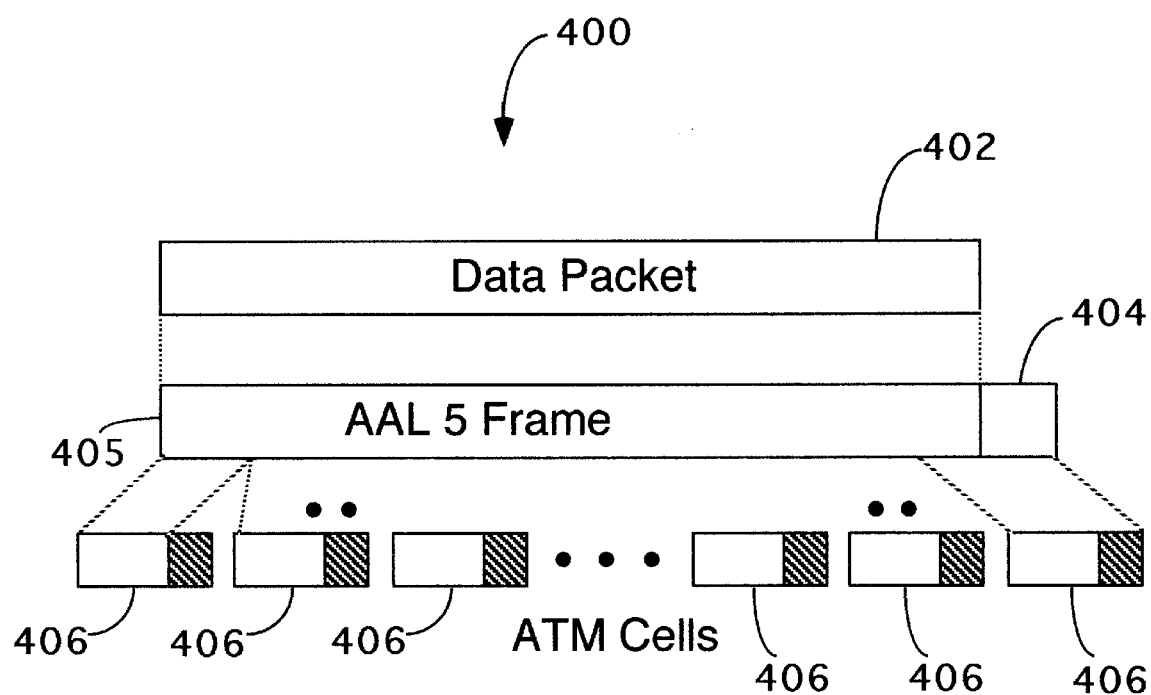
FIG. 4 illustrates an AAL-5 frame being broken down into ATM cells.

FIG. 4 illustrates an AAL-5 frame being broken down into ATM cells 400. Initially, a data packet 402 is received at the ATM Adaptation Layer where a header 404 is attached to the data packet to form the AAL-5 PDU 405. The AAL-5 PDU 405 is then segmented into 48 octet ATM cells 406.

Figure 5:
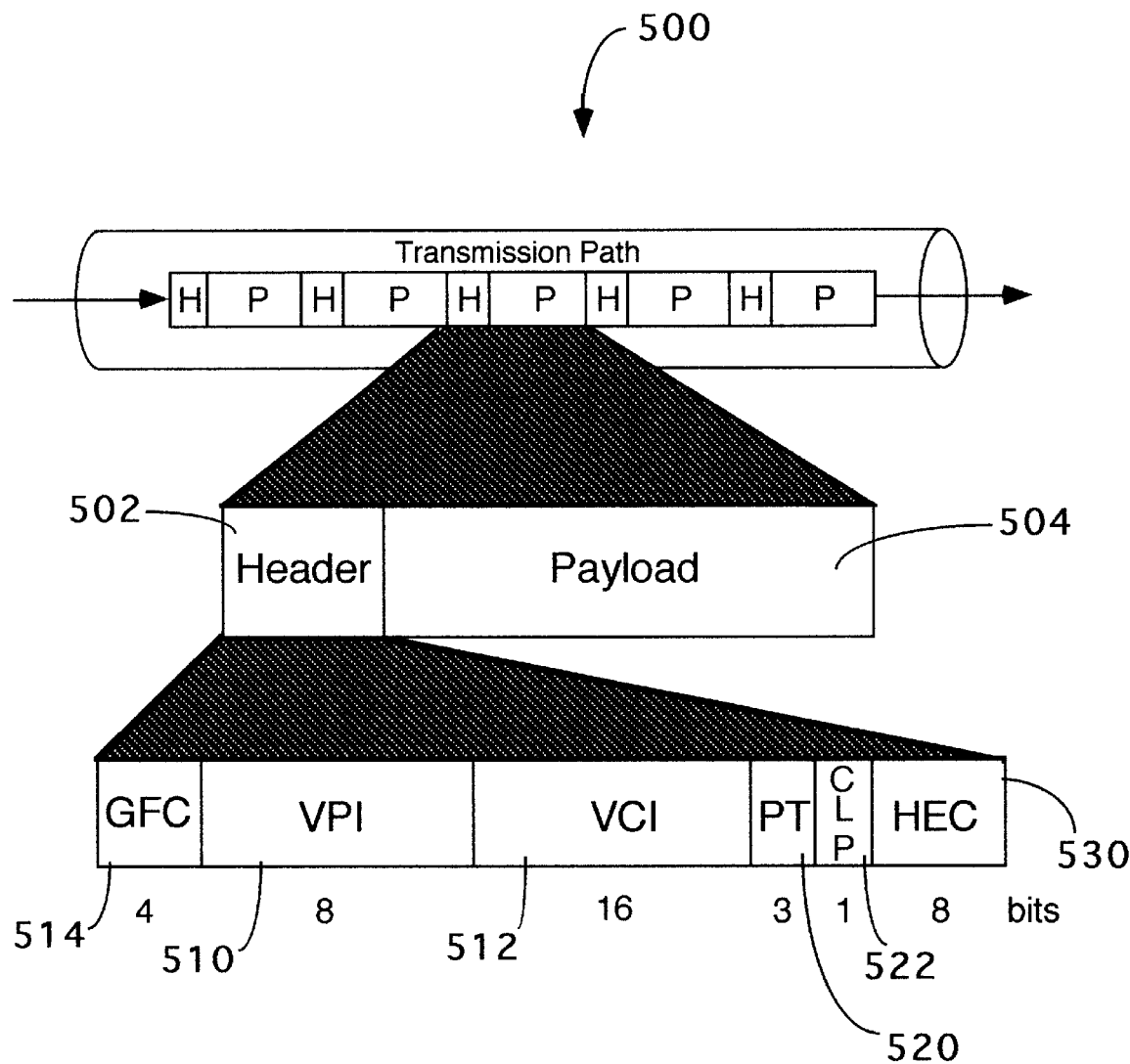
FIG. 5 illustrates an ATM cell.

FIG. 5 illustrates the format 500 for an ATM cell. The ATM standards define a fixed-size cell with a length of 53 octets comprised of a 5 octet header 502 and a 48 octet payload 504. The bits for a packet are transmitted over the transmission path in a continuous stream. All information is switched and multiplexed in an ATM network in these fixed-length cells. The cell header 502 identifies the destination, cell type and priority. The Virtual Path Identifier (VPI) 510 and Virtual Channel Identifier (VCI) 512 hold local significance only, and identify the destination. The Generic Flow Control (GFC) field 514 allows a multiplexer to control the rate of an ATM terminal. The Payload Type (PT) 520 indicates whether the cell contains user data, signaling data, or maintenance information. The Cell Loss Priority (CLP) 522 indicates the relative priority of the cell. Lower priority cells are discarded before higher priority cells during congested intervals. Finally, a Header Error Check (HEC) 530 is provided to detect and correct errors in the header.

The Virtual Channel Identifier (VCI) 512 in the cell header identifies a single VC on a particular Virtual Path (VP). Switching at a VC connecting point is done based upon the combination of VP and VCI 512. A VC link is defined as a unidirectional flow of ATM cells with the same VCI 512 between a VC connecting point and either a VC endpoint or another VC connecting point. A VC endpoint also is called an ATM Service Access Point (SAP).

ATM connections provide both best-effort and guaranteed service. Guaranteed service is based on traffic contract agreed on ATM connection setup both by traffic source and network. The traffic contract is enforced by the network. The ingress of the network monitors the offered traffic on each connection to check that it is within agreed bounds and thus can be delivered through the network without causing service degradation to other users by using resources from their connections. This monitoring is called policing and it works either by discarding the non-conforming cells immediately or by performing cell tagging. Cell tagging involves marking the violating cells as low priority ones by setting the Cell Loss Priority flag. Using this notification the subsequent network elements in the network are able to discard non-conforming cells before conforming ones in face of congestion. This option can be used if there are available resources internal to network element (ATM node).

As mentioned earlier, ATM switching and ATM network deal only with cells and does not care what is the information carried in those cells. ATM cells have a fixed length payload field that is 48 octets. Data packets that are carried in ATM cells are normally longer than 48 octets and not integral multiple of 48 and therefore ATM Adaptation Layer (AA-L) is used to assemble and reassemble those packets into/from cells. If for one reason or the other one or more of the cells of a AAL frame are discarded in the network whole frame will be lost as destination host is not able to reassemble the packet.

One place where cells can be discarded is at the edges of the network where policing functions are performed. Accordingly to the invention, the standard cell based policing function is enhanced so that it will recognize AAL-5 frames in order to increase packet throughput, or rather the effective throughput.

ATM layer switching only checks the value of ATM header and acts on that value. As a consequence of this, a generic solution must be based on those fields. Data communications relies mostly on AAL-5, which uses AUU of the ATM header to indicate AAL-5 PDU boundaries, i.e. which cells belong to which packet within one VCC. If this AUU indication is set in the ATM header it means that the cell carrying this indication is the last cell of a frame.

Figure 6:
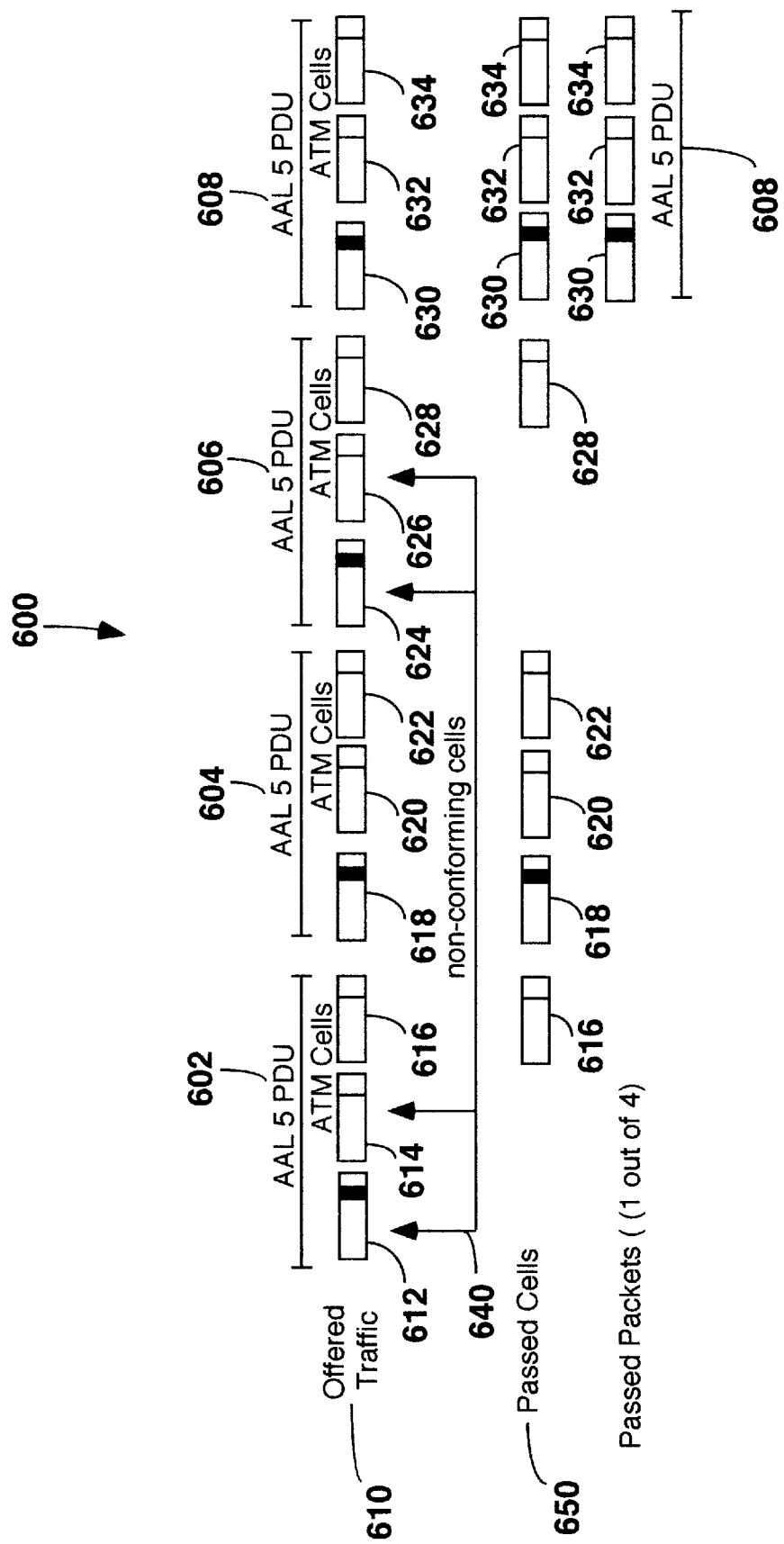
FIG. 6 illustrates the effect of policing on packet throughput.

FIG. 6 illustrates the effect of policing on packet throughput 600. In FIG. 6, AAL-5 packets 602–608 provide offered traffic 610 in the form of cells 612–634. of the cells 612–634, some are non-conforming cells 640. As a result, the non-conforming cells 612, 614, 624, 626 are discarded. Cells are discarded based on the information of the cell based traffic contract only. Thus, only the conforming cells are passed 650. However, even if two thirds of cells are passed, the packet throughput achieved is only in order of 25% (or 1 out of 4). The third packet 604, which includes cells 618, 620, 622, is dropped since cells 618, 620, 622 are merged with the conforming cell 628 of the second packet 606. Accordingly, only packet 608 is passed.

One of most popular policing mechanism uses a notion of leaky bucket. The size of the virtual bucket together with the rate at which the bucket is emptied reflects the traffic contract. For the purpose of the discussion in the rest of this section we can assume that credit equals the size of the bucket. In the present invention, the bucket size can be temporarily extended over its normal size (either by reserve credit or bonus credit).

According to the invention, packet based policing (PBP) is like normal cell based policing (CBP), but cells are not necessarily discarded immediately after the first non-conforming cells is received. Instead the non-conforming cells are passed on, if possible, with the same priority marking (identical values in CLP field of ATM header) as rest of related cells it already has forwarded. While these non-conforming cells are forwarded, the number of non-conforming cells which were passed are counted using a reserve credit. In other words, the number of cells that normally would have been marked as non conforming, and therefore would be discarded, but which were passed are counted. When the last cell of the frame is passed, the amount of reserve credit or borrowed cells is taken into account when updating the credit used by cell based policing.

In the simplest version, the policing function, after completing the passing of a frame that caused the credit to be exceeded, discards all cells received on that VCC. If the reserve credit is paid back in the middle of a frame, cells are still discarded until the end of the frame, with the last cell discarded being the one with AUU indication set. While doing that it may count how many conforming cells are discarded and increase the corresponding credit by that amount (bonus credit).

FIG. 7 illustrates a chart 700 of the credit values 702 and actions 704 for a packet based policing method according to the present invention. In FIG. 7, state diagram illustrating transitions between reserve credit states is discussed below with reference to FIG. 11. The packet based policing method of the present invention includes a reserve credit value 710, a normal credit value 720 and a bonus credit value 730. The reserve credit value 710 is defined as a negative value up to the Maximum Reserve Credit (MRC) 712. The normal credit value 720 is a normal cell based policing value 722. The bonus credit value 730 is the normal credit value increased by extra credit obtained when conforming cells were discarded 732.

A reserve credit is created by forwarding non-conforming cell until the end of the packet 714. When the system has a normal credit, it acts as a normal cell based policing method 724. When the system has a bonus credit, the system acts as a normal cell based policing method, but with a temporary bonus credit 734.

FIG. 8 illustrates the allowed state transitions 800 between the three credit states discussed with reference to FIG. 7. According to FIG. 8, the system allows transitions from a reserve state 802 to a normal state 812. The system also allows a transition form a reserve state 804 to a bonus state 814. From the normal state 806, the system only allows a transition to a reserved state 816 due to the borrowing of cell credits. Finally, the system allows a transition from the bonus credit state 808 to the normal credit state 818. As a consequence of this packet based policing method, the packet throughput is higher than with a cell based policing method.

Figure 9:
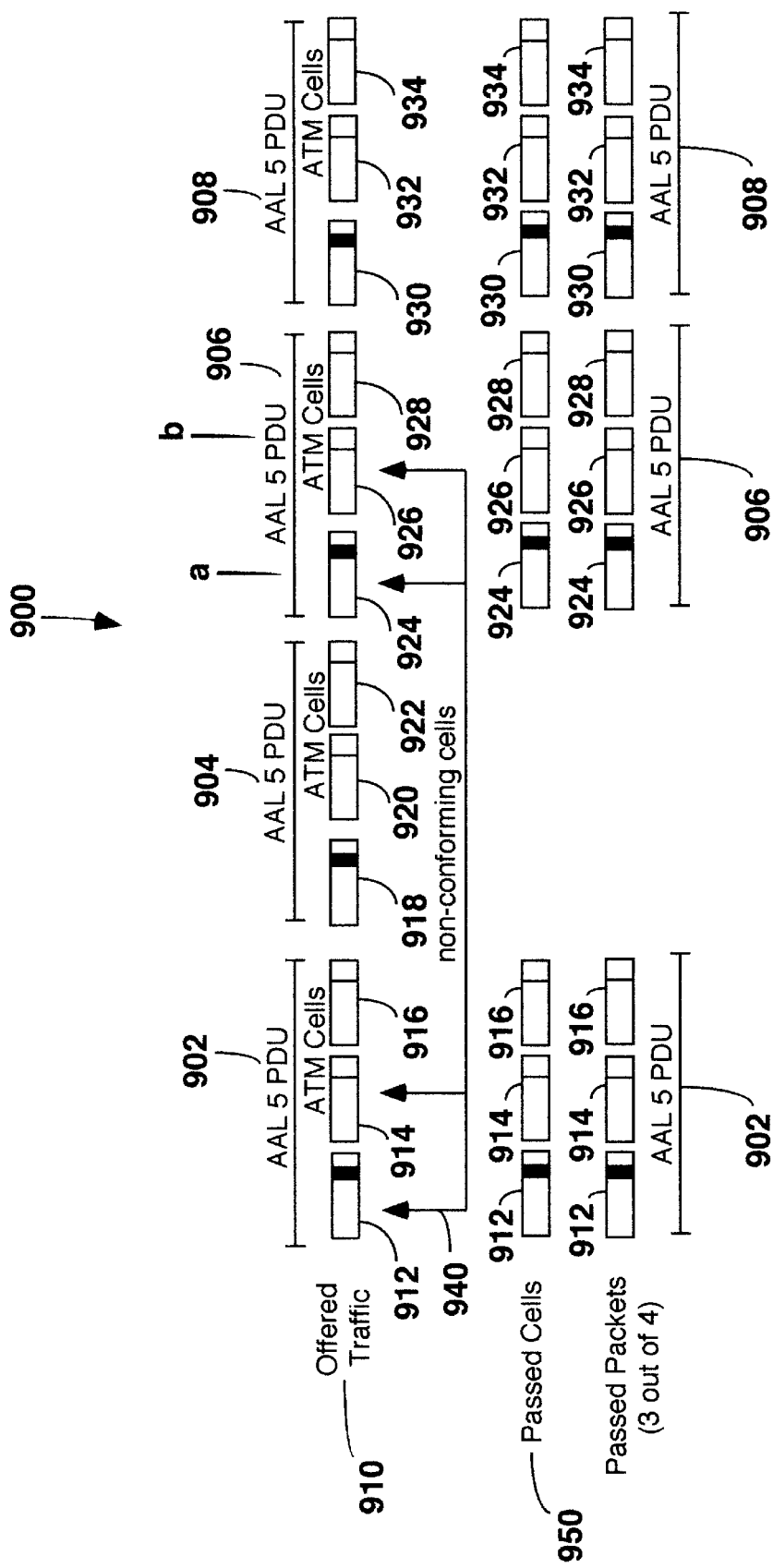
FIG. 9 illustrates the policing functions according to the present invention.

FIG. 9 illustrates the operation 900 of the packet based policing method according to the present invention. In FIG. 9, AAL-5 packets 902–908 provide offered traffic 910 in the form of cells 912–934. Of the cells 912–934, some are non-conforming cells 940.

As depicted in FIG. 9, packet integrity can be maintained by performing policing so that cells are discarded right after a cell that has AUU indication set. In FIG. 9, the cells 930-934 of the first packet 908 are passed since the packet 908 does not contain any non-conforming cells 940. However, cells 924–928 of the second packet 906 are also passed, even though cells 924 and 926 are non-conforming. Thus, a reserve credit of two exists after cells 924 and 926 are passed. Thus, all cells 918–922 of the next packet 904 are dropped. However, since all of these cells 918–922 are conforming, a bonus credit of one is created, i.e., the number of dropped conforming cells 918–922 exceeds the reserve credit by one. Thus, this bonus credit can be used to pass the first non-conforming cell 914 of the next packet 902. Accordingly, the last cell 912 requires using only one reserve credit to complete passage of the last packet 902.

The packet based policing method works both with best effort and guaranteed service. Packet based policing according to the present invention decreases the likelihood that cells are carried across the network that are then discarded by destination host because of an incomplete packet. Therefore the proposed method increases the real throughput, "goodput", of the network.

However, it may appear that to work efficiently, more resources (bandwidth) have to be assigned to links that carry other ATM traffic classes in addition to UBR. This is because giving reserve credit requires additional resources. Nevertheless, in practice the required additional bandwidth is negligible when statistical multiplexing comes into play.

Policing functions have to configurable for each VCC whether it is a cell or packet based. For each VCC for which packet based policing is applied, a Maximum Reserve Credit (MRC) value can be defined. The Maximum Reserve Credit will be the upper limit of the reserve credit and a frame is aborted if passing its cells would require exceeding that value.

If policing has to discard the rest of the cells of a packet after already starting to forward cells of that packet, special action has to be taken or otherwise the risk of losing two packets instead of one occurs. This occurs because the loss of the last cell of a packet results in the merging of two packets, which causes reassembly to fail.

To avoid this policing has to either always relay the last cell of a packet, i.e. the one with AUU set, or generate an empty cell with the AUU set to abort packet reassembly. Always relaying the last cell of a packet is easy to implement, but may lead to situation where malicious users generate packets that have AUU set and will end up exceeding the resources allowed to be used by them. Cells with the AUU set to abort packet reassembly would do their job, but are of no use for the destination host. These abort cells are not the ones generated by this source host, but by the PBP function, and their payload contains data that is not meaningful to for the destination system.

Referring to FIG. 9, if a reserve credit exits for only one cell, the first non-conforming cell (b) 926 may be passed, but the next cell (a) 924 is also a non-conforming cell. Thus, a dilemma is presented. If the next cell (a) 924, which is non-conforming cell, is deleted, the next three cells 918–922 belonging to next packet 904, which happen to be conforming cells, cause the packet to be discarded in the VCC termination point where AAL-5 reassembly takes place, because the deletion of the cell carrying the end of packet indication 924 results in the three conforming cells 918–922 to be merged with the cells 926, 928 of the preceding packet 906. Thus, the CRC would indicate an invalid value.

To avoid this problem, the packet based policing method according to the present invention either generates an "abort" cell, always passes the last cell 924 even if it is non-conforming and deletes all non-conforming cells 926 before the last cell 924 or discards all cells 920–922 except for the cell with the AUU set 918 of the next packet 904, so that the last cell 918 of next packet 904 is used to abort the previous packet 906.

Figure 10:
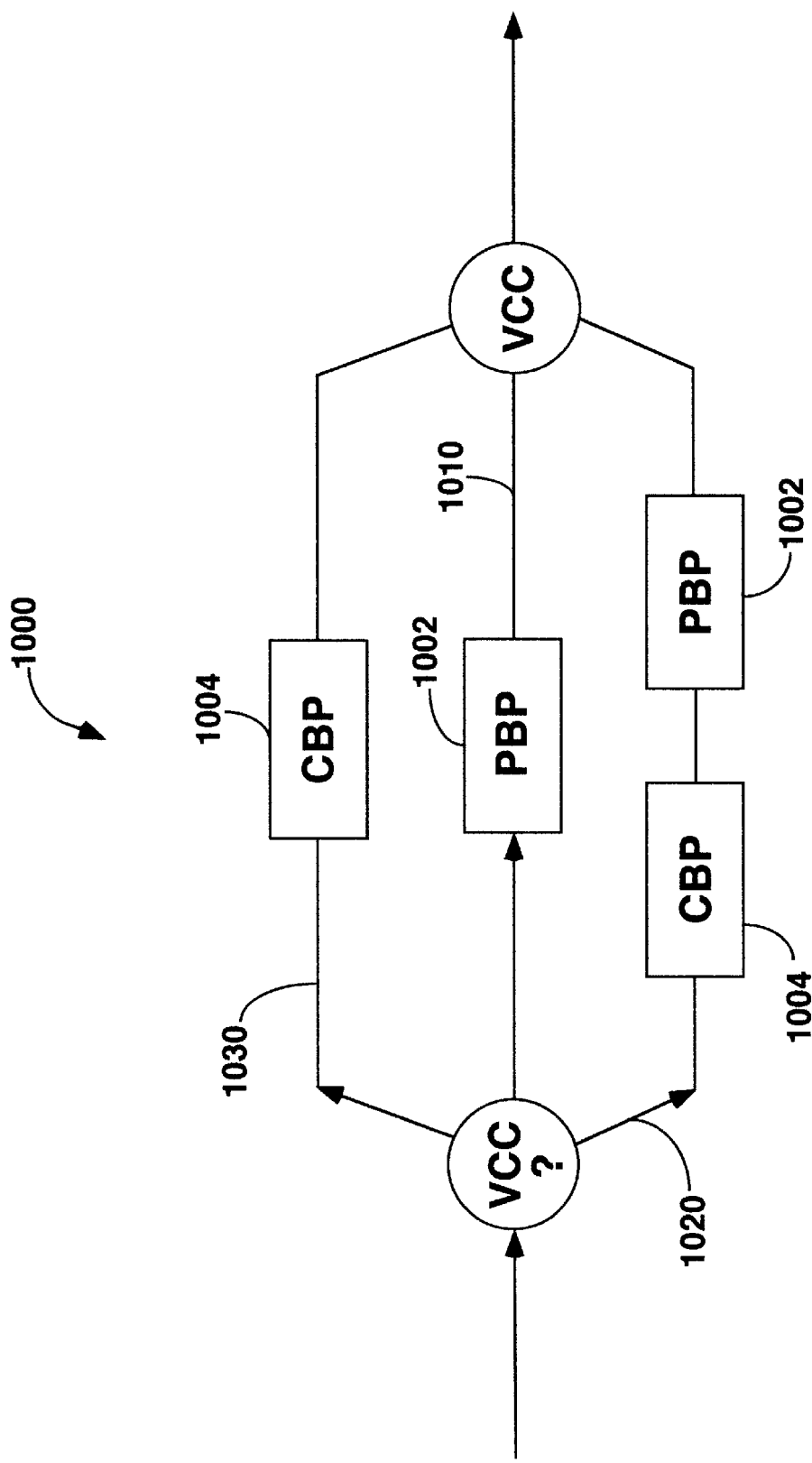
FIG. 10 illustrates a policing module for implementing the packet based policing scheme.

FIG. 10 illustrates a policing module 1000 for implementing the packet based policing scheme. A packet based policing module 1002 may be used alone 1010 or in combination 1020 with a cell based policing module 1004. In the equipment that implements these policing methods, the policing method can be made configurable for each VCC. Thus, the system may use a cell based policing module 1004 alone 1030, a packet based policing module 1002 alone 1010, or provide a combination 1020 of a cell based policing module 1004 and packet based policing module 1002. With the combination approach 1020, incoming cells are first policed by a cell based policing module 1004 and then the resulting cell stream is fed into the packet based policing module 1002. Chaining the policing modules (CBP+PBP) 1002, 1004 provides true ATM level conformance, while decreasing the probability of carrying partial packets in the network.

In FIG. 10, the first VCC receives incoming cells. The applied method for each VCC will be determined by the VPI/VCI 1050 value of the incoming packets. In FIG. 10, the combination method 1020 requires that the cell based policing module 1004 informs the packet based policing module 1002 when the cell based policing module 1004 has discarded a cell. It is beneficial if a cell based policing module 1004 can tell what kind of cell the discarded cell was, i.e., whether the cell discarded was a cell with the AUU not set or a cell with AUU set. In this manner, the packet based policing module 1002 can minimize the packet loss. Nevertheless, those skilled in the art will recognize that this will require modification to cell based policing module 1004, since the standard implementation of cell based policing does not support this type of communication.

Still, the reasons are clear why a classification of the dropped cell must be provided. If the cell which was discarded was a cell with AUU not set, the packet based policing module 1002 knows that only one packet will be dropped because of loss of that cell if it discards all subsequent cells received with that VPI/VCI until the cell that has AUU set. If the cell which was discarded was a cell with the AUU set, the packet based policing module 1002 knows that only one packet will be dropped because of the loss of that cell if it sends an "abort" cell. Alternatively, if an "abort" cell is not allowed due to the configuration option, then all subsequent cells may be dropped until one with the AUU set is received. This cell is then forwarded in order to abort the cell reassembly and save the next packet from merging.

If this qualifying information on discarded cell is missing then the packet based policing module 1002 acts according to the case where the cell dropped by the cell based policing module 1004 was a cell with AUU not set, which normally leads to loss of one packet and in the worst case, if the discarded cell was the one with AUU set, to loss two packets.

Figure 11:
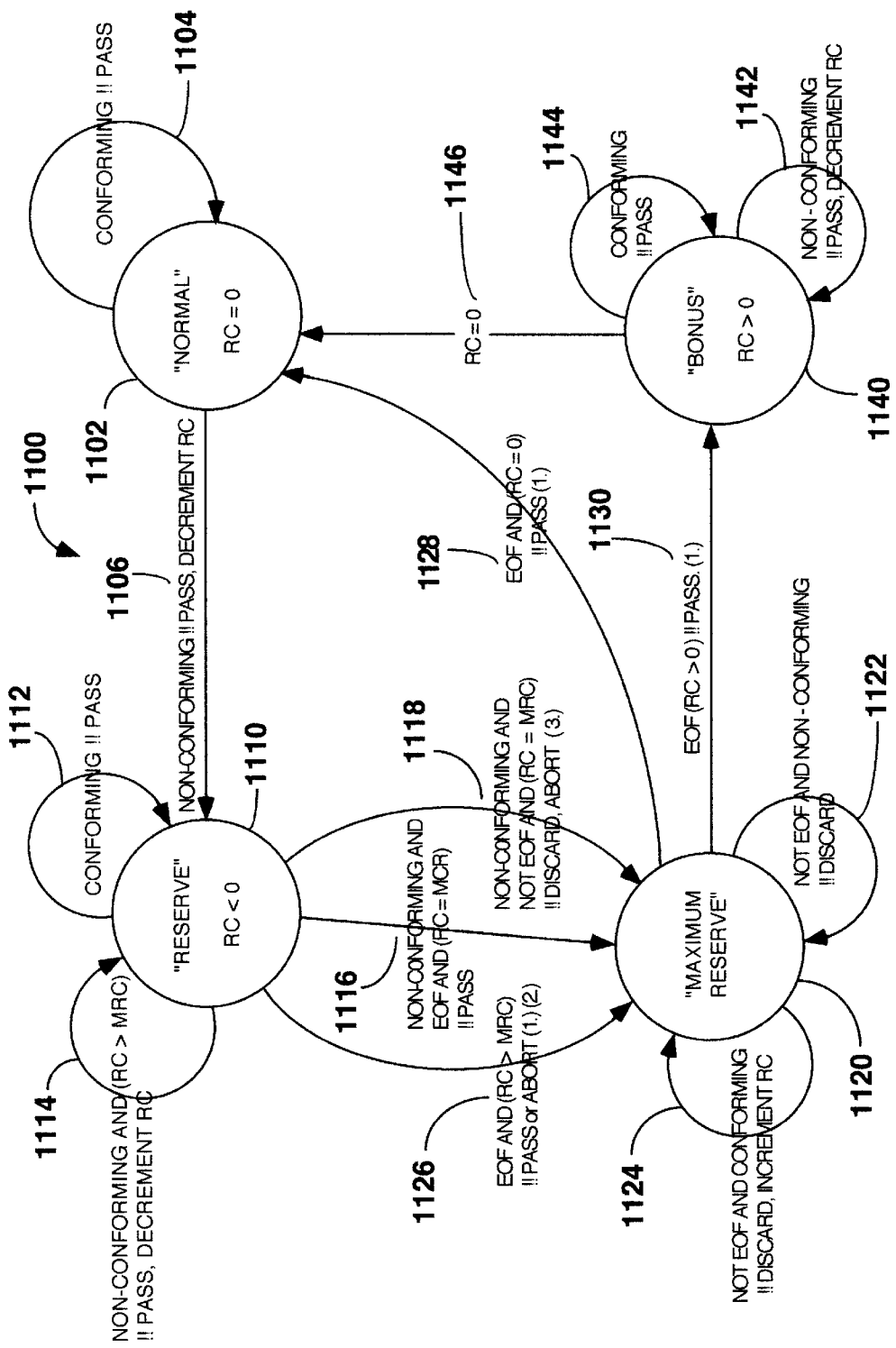
FIG. 11 illustrates a state diagram of the policing method according to the present invention.

FIG. 11 illustrates a state diagram 1100 of the policing method according to the present invention. The operation of the packet based policing method depends upon the running credit value. In a normal credit state 1102 the reserve credit is zero and all conforming cells are passed 1104. Upon receipt of a non-conforming cell, the cell is passed and the reserve credit is decremented 1106. This causes a transition to the reserve state 1110 where the reserve credit is less than zero. In the reserve credit state 1110, conforming cells are passed 1112. Non-conforming cells are passed and the reserve credit is decremented if the reserve credit is less than a predefined maximum reserve credit 1114.

The maximum reserve credit state 1120 is entered from the reserve credit state 1110 under two circumstances. First, if the cell is non-conforming and an End-of-Frame (EOF) cell while the reserve credit is equal to the maximum reserve credit, then the cell is passed and the maximum reserve credit state is entered 1116. Secondly, if the cell is non-conforming and not an EOF cell while the reserve credit is equal to maximum reserve credit, then the cell is discarded and the frame is aborted 1118. However, the action to discard or discard and send an abort is a configurable parameter.

In the maximum reserve credit state 1120, a cell is discarded is it is not an EOF regardless of whether the cell is conforming or non-conforming 1122, 1124. However, when the cell is conforming, the reserve credit is incremented 1124. If the cell is an EOF cell and the reserve credit is greater than the maximum reserve credit, the cell is either passed or the frame is aborted and the reserve credit state is entered 1126. If the cell is an EOF cell and the reserve credit is zero, the cell is passed and the normal state is entered 1128. Finally, if the cell is an EOF cell and the reserve credit is greater than zero, the cell is passed 1130 and the bonus credit state 1140 is entered. However, the EOF cell is passed only if the previous passed cell was not an EOF cell. Further, the action of whether to pass the EOF cell or send an abort is a configurable parameter.

In the bonus credit state 1140, non-conforming cells are passed and the reserve credit is decremented 1142. Furthermore, conforming cells are passed 1144. Whenever the reserve credit becomes equal to zero, a state transition 1146 from the bonus credit state 1140 to the normal credit state 1102 occurs.

Figure 12:
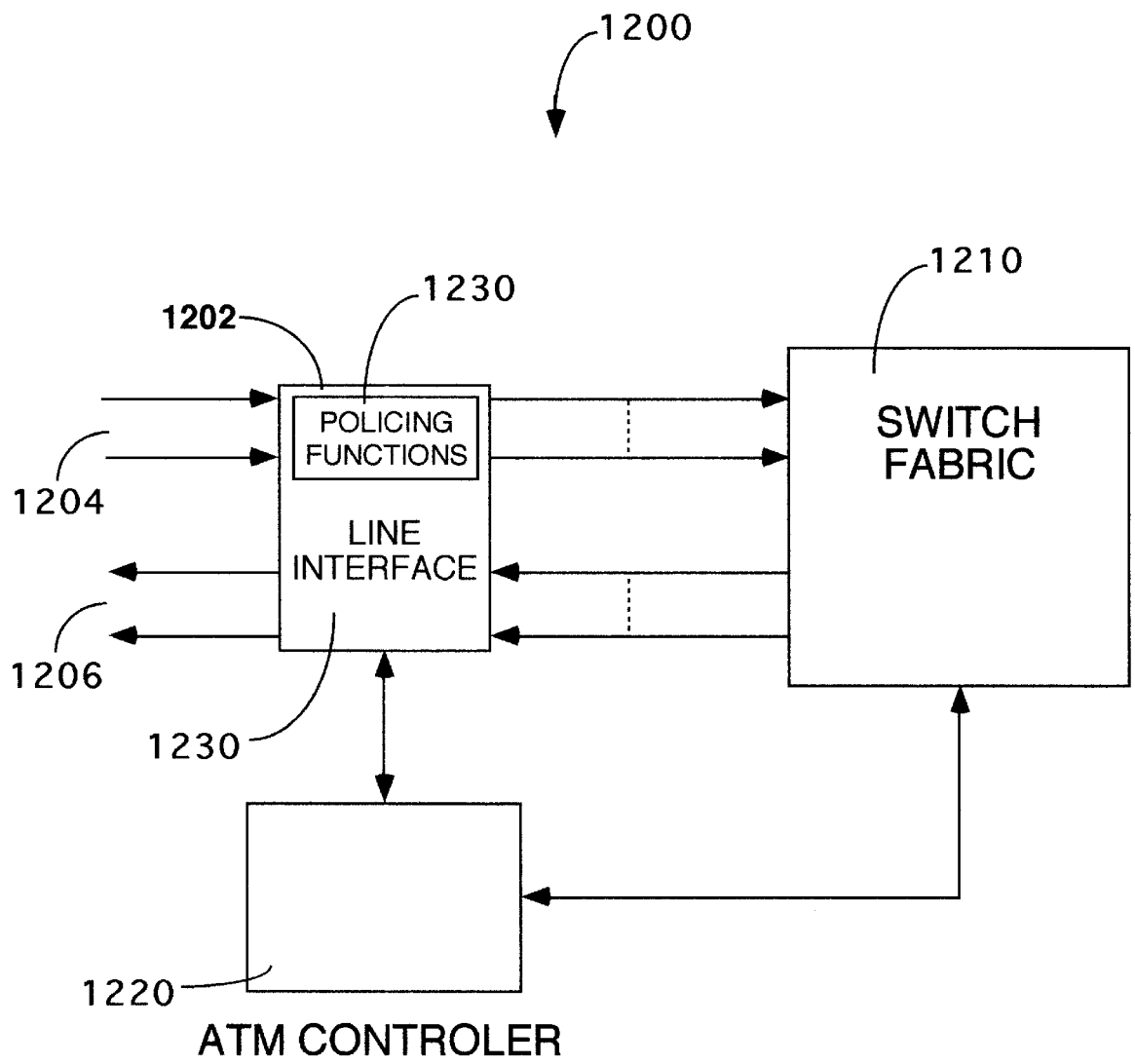
FIG. 12 illustrates a cell relay switch implementing a packet based policing method according to the present invention.

FIG. 12 illustrates a cell relay switch 1200 according to the present invention. The cell relay switch 1200 includes a line interface device 1202 having a plurality of input and output ports connected to a plurality of virtual channel links 1204, 1206 for receiving cells. A switch 1210 is operatively coupled to the line interface card 1202 for routing incoming cells received from incoming virtual channel links 1204 to outgoing virtual channel links 1206. A switch controller 1220 or administration unit is operatively coupled to the line interface device 1202 for supervising and coordinating the establishment, modification and termination of connections through the switch 1210.

According to the present invention, the line interface device 1202 polices the cell traffic. However, those skilled in the art will recognize that the policing functions are not restricted to implementation in a line interface device. For, example, the policing functions could be implemented in the administration unit. Nevertheless, the discussion herein will assume that the policing functions are implemented in the line interface device.

Accordingly, the line interface device 1202 includes the hardware and/or software for performing the policing functions 1230 as illustrated in FIG. 13. The policing functions 1230 determine whether a non-conforming cell may be passed according to a running credit value, identify whether a cell is conforming or non-conforming cell, pass the cell if the running credit value indicates that a non-conforming cell may be passed or if the cell is a conforming cell, borrows a cell credit if the credit value indicates that a non-conforming cell cannot be passed, the borrowing of the cell credit allowing the running credit value to be decremented until reaching a predetermined negative number and decrements the running credit value.

All cells of the packet immediately subsequent to the first packet may be discarded and the credit value is incremented for each conforming cell of the subsequent packet that was discarded. A bonus credit is added to the credit value for the number of conforming cells discarded in the subsequent packet exceeding the number of cells borrowed to pass the first packet. All cells of all subsequent packets are discarded until the number of discarded conforming cells for all subsequent packets is not less than the number of borrowed cell credits used in passing cells of the first packet. The predetermined negative number represents a Maximum Reserve Credit. Whether the cell is the last cell of the first frame is ascertained and the last cell is processed such that cells of the first packet are not merged with cells passed next.

The processing may be performed by sending an abort cell in place of the last cell to cause the other cells in the first packet to be discarded, discarding the last cell and all subsequent cells until another last cell is received, the last cell being passed and merged with the other passed cells of the first packet or passing the last cell and deleting all non-conforming cells passed before the last cell.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of improving throughput of a network, comprising the steps of:

receiving cells for a first packet at a node in a network;

determining whether the cells of the first packet are non-conforming or conforming cells;

decrementing a credit value for each non-conforming cell of the first packet;

passing the cells of the first packet based upon the determining step;

totaling the number of non-conforming cells of the first packet that were passed after a last cell of the first packet has been passed;

discarding all cells of a subsequent packet; and incrementing the credit value for each conforming cell of the subsequent packet that were discarded.

2. The method of claim 1 wherein the credit value comprises a normal credit and a reserve credit, the reserved credit representing borrowed cells credits, the borrowed cells credits designating the number of non-conforming cells of the first packet that were passed in excess of a normal credit.

3. The method of claim 2 wherein the reserve credit is not greater than the Maximum Reserve Credit.

4. The method of claim 2 wherein the credit value comprises a bonus credit representing conforming cells which were dropped in the subsequent packet in excess of the borrowed cells used in forwarding the non-conforming cells of the first packet.

5. The method of claim 1 wherein the credit value comprises a bonus credit representing conforming cells which were dropped in the subsequent packet in excess of borrowed cells used in forwarding the non-conforming cells of the first packet.

6. The method of claim 1 wherein the determining step further comprises the steps of:

ascertaining whether the cell is the last cell of the first frame;

processing the last cell so that cells of the first packet are not merged with cells passed next.

7. The method of claim 6 wherein the step of processing the last cell further comprises the step of sending an abort cell in place of the last cell, the abort cell causing the other cells in the first packet to be discarded.

8. The method of claim 6 wherein the step of processing the last cell further comprises the step of discarding the last cell and all subsequent cells until another last cell is received, the last cell being passed and merged with the other passed cells of the first packet.

9. The method of claim 6 wherein the step of processing the last cell further comprises the step of passing the last cell and deleting all cells passed before the last cell.

10. A method of for performing packet based policing, comprising the steps of:

receiving cells for a first packet at a node in a network;

determining whether a non-conforming cell may be passed according to a running credit value;

identifying whether a cell is conforming or non-conforming cell;

passing the cell if the running credit value indicates that a non-conforming cell may be passed or if the cell is a conforming cell;

borrowing a cell credit if the credit value indicates that a non-conforming cell cannot be passed, the borrowing of the cell credit allowing the running credit value to be decremented until reaching a predetermined negative number; and decrementing the running credit value.

11. The method of claim 10 further comprising the steps of:

discarding all cells of packet immediately subsequent to the first packet; and incrementing the credit value for each conforming cell of the subsequent packet that was discarded.

12. The method of claim 11 wherein the step of incrementing the credit value for each conforming cell of the subsequent packet that was discarded results in the credit value having a bonus credit value added thereon if the number of conforming cells discarded in the subsequent packet exceeds the number of cells borrowed to pass the first packet.

13. The method of claim 12 wherein the step of discarding cells of the subsequent packet further comprises the step of discarding all cells of all subsequent packets until the number of discarded conforming cells for all subsequent packets is not less than the number of borrowed cell credits used in passing cells of the first packet.

14. The method of claim 10 wherein the predetermined negative number represents a Maximum Reserve Credit.

15. The method of claim 10 wherein the identifying step further comprises the steps of:

ascertaining whether the cell is the last cell of the first frame;

processing the last cell so that cells of the first packet are not merged with cells passed next.

16. The method of claim 15 wherein the step of processing the last cell further comprises the step of sending an abort cell in place of the last cell, the abort cell causing the other cells in the first packet to be discarded.

17. The method of claim 15 wherein the step of processing the last cell further comprises the step of discarding the last cell and all subsequent cells until another last cell is received, the last cell being passed and merged with the other passed cells of the first packet.

18. The method of claim 15 wherein the step of processing the last cell further comprises the step of passing the last cell and deleting all cells passed before the last cell.

19. A cell relay switch, comprising:

a line interface device having a plurality of input and output ports connected to a plurality of virtual channel links for receiving cells;

a switch, operatively coupled to the line interface card for routing incoming cells received from incoming virtual channel links to outgoing virtual channel links; and a switch controller, operatively coupled to the line interface device for supervising and coordinating the establishment, modification and termination of connections through the switch;

wherein the line interface device polices the cell traffic by determining whether a non-conforming cell may be passed according to a running credit value, identifying whether a cell is conforming or non-conforming cell, passing the cell if the running credit value indicates that a non-conforming cell may be passed or if the cell is a conforming cell, borrowing a cell credit if the credit value indicates that a non-conforming cell cannot be passed, the borrowing of the cell credit allowing the running credit value to be decremented until reaching a predetermined negative number and decrementing the running credit value.

20. The cell relay switch of claim 19 wherein the line interface device further comprises:

means for discarding all cells of the packet immediately subsequent to the first packet; and means for incrementing the credit value for each conforming cell of the subsequent packet that was discarded.

21. The cell relay switch of claim 19 wherein the line interface device adds a bonus credit to the credit value for the number of conforming cells discarded in the subsequent packet exceeding the number of cells borrowed to pass the first packet.

22. The cell relay switch of claim 21 wherein the line interface device discards all cells of all subsequent packets until the number of discarded conforming cells for all subsequent packets is not less than the number of borrowed cell credits used in passing cells of the first packet.

23. The cell relay switch of claim 19 wherein the predetermined negative number represents a Maximum Reserve Credit.

24. The cell relay switch of claim 19 wherein the line interface device further comprises:

means for ascertaining whether the cell is the last cell of the first frame; and means for processing the last cell so that cells of the first packet are not merged with cells passed next.

25. The cell relay switch of claim 24 wherein the means for processing the last cell sends an abort cell in place of the last cell, the abort cell causing the other cells in the first packet to be discarded.

26. The cell relay switch of claim 24 wherein the means for processing the last cell discards the last cell and all subsequent cells until another last cell is received, the last cell being passed and merged with the other passed cells of the first packet.

27. The cell relay switch of claim 24 wherein the means for processing the last cell passes the last cell and deletes all cells passed before the last cell.

28. A cell relay switch, comprising:

a line interface device having a plurality of input and output ports connected to a plurality of virtual channel links for receiving cells;

a switch, operatively coupled to the line interface card for routing incoming cells received from incoming virtual channel links to outgoing virtual channel links; and a switch controller, operatively coupled to the line interface device for supervising and coordinating the establishment, modification and termination of connections through the switch;

wherein the switch controller polices the cell traffic by determining whether a non-conforming cell may be passed according to a running credit value, identifying whether a cell is conforming or non-conforming cell, passing the cell if the running credit value indicates that a non-conforming cell may be passed or if the cell is a conforming cell, borrowing a cell credit if the credit value indicates that a non-conforming cell cannot be passed, the borrowing of the cell credit allowing the running credit value to be decremented until reaching a predetermined negative number and decrementing the running credit value.

29. The cell relay switch of claim 28 wherein the switch controller further comprises:

means for discarding all cells of the packet immediately subsequent to the first packet; and means for incrementing the credit value for each conforming cell of the subsequent packet that was discarded.

30. The cell relay switch of claim 28 wherein the switch controller adds a bonus credit to the credit value for the number of conforming cells discarded in the subsequent packet exceeding the number of cells borrowed to pass the first packet.

31. The cell relay switch of claim 30 wherein switch controller discards all cells of all subsequent packets until the number of discarded conforming cells for all subsequent packets is not less than the number of borrowed cell credits used in passing cells of the first packet.

32. The cell relay switch of claim 28 wherein the predetermined negative number represents a Maximum Reserve Credit.

33. The cell relay switch of claim 28 further comprising:

means for ascertaining whether the cell is the last cell of the first frame; and means for processing the last cell so that cells of the first packet are not merged with cells passed next.

34. The cell relay switch of claim 33 wherein the means for processing the last cell sends an abort cell in place of the last cell, the abort cell causing the other cells in the first packet to be discarded.

35. The cell relay switch of claim 33 wherein the means for processing the last cell discards the last cell and all subsequent cells until another last cell is received, the last cell being passed and merged with the other passed cells of the first packet.

36. The cell relay switch of claim 33 wherein the means for processing the last cell passes the last cell and deletes all cells passed before the last cell.

37. A cell relay switch, comprising:

means for receiving cells having a plurality of input and output ports connected to a plurality of virtual channel links;

means, operatively coupled to the receiving means, for routing incoming cells received from incoming virtual channel links to outgoing virtual channel links; and means, operatively coupled to the receiving means, for supervising and coordinating the establishment, modification and termination of connections through the switch;

means, operatively coupled to the supervising means, for determining whether a non-conforming cell may be passed according to a running credit value;

means, operatively coupled to the supervising means, for identifying whether a cell is conforming or non-conforming cell;

means, operatively coupled to the supervising means, for passing the cell if the running credit value indicates that a non-conforming cell may be passed or if the cell is a conforming cell;

means, operatively coupled to the supervising means, for borrowing a cell credit if the credit value indicates that a non-conforming cell cannot be passed, the borrowing of the cell credit allowing the running credit value to be decremented until reaching a predetermined negative number; and means, operatively coupled to the supervising means, for decrementing the running credit value.

38. The cell relay switch of claim 37 further comprising:

means for discarding all cells of the packet immediately subsequent to the first packet; and means for incrementing the credit value for each conforming cell of the subsequent packet that was discarded.

39. The cell relay switch of claim 37 wherein the incrementing means adds a bonus credit to the credit value for the number of conforming cells discarded in the subsequent packet exceeding the number of cells borrowed to pass the first packet.

40. The cell relay switch of claim 39 wherein the discarding means discards all cells of all subsequent packets until the number of discarded conforming cells for all subsequent packets is not less than the number of borrowed cell credits used in passing cells of the first packet.

41. The cell relay switch of claim 37 wherein the predetermined negative number represents a Maximum Reserve Credit.

42. The cell relay switch of claim 37 further comprising:

means for ascertaining whether the cell is the last cell of the first frame; and means for processing the last cell so that cells of the first packet are not merged with cells passed next.

43. The cell relay switch of claim 42 wherein the means for processing the last cell sends an abort cell in place of the last cell, the abort cell causing the other cells in the first packet to be discarded.

44. The cell relay switch of claim 42 wherein the means for processing the last cell discards the last cell and all subsequent cells until another last cell is received, the last cell being passed and merged with the other passed cells of the first packet.

45. The cell relay switch of claim 42 wherein the means for processing the last cell passes the last cell and delete all cells passed before the last cell.

* * * * *